Oct. 29, 1940. E. B. SLEETER ET AL 2,219,495
CONDENSER MOUNTING
Filed July 25, 1938
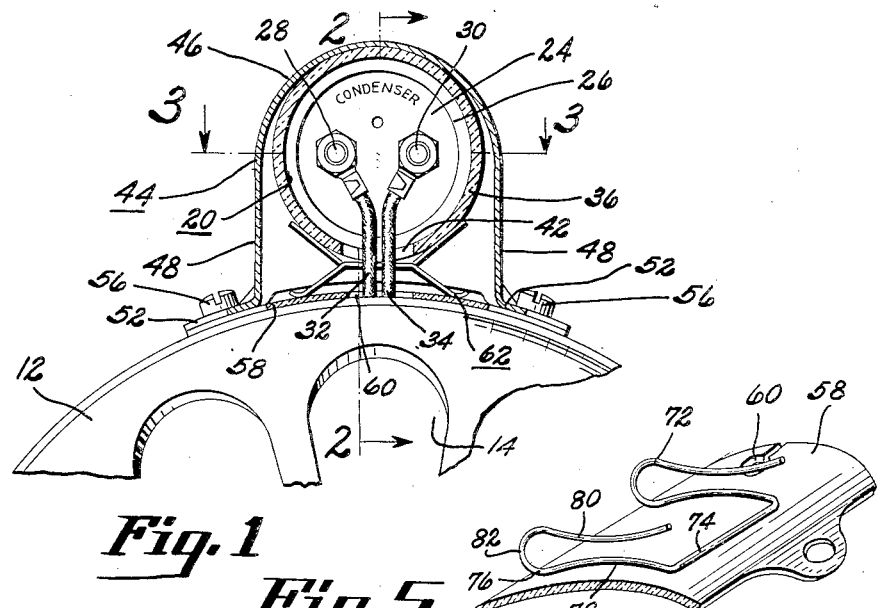
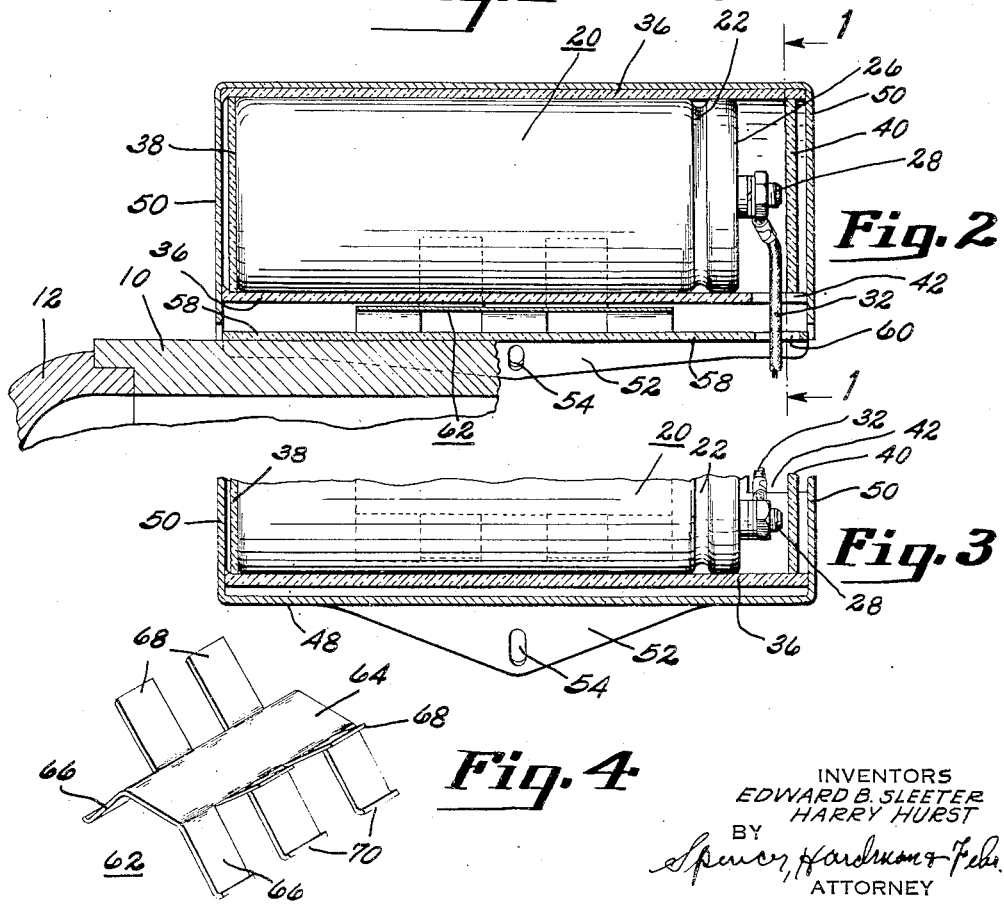
INVENTORS
EDWARD B. SLEETER
HARRY HURST
BY
Spencer, Hardman & Febr.
ATTORNEY Patented Oct. 29, 1940

2,219,495

UNITED STATES PATENT OFFICE 2,219,495

CONDENSER MOUNTING

Edward B. Sleeter and Harry Hurst, Dayton, Ohio, assignors to General Motors Corporation, Detroit, Mich., a corporation of Delaware Application July 25, 1938, Serial No. 221,081

2 Claims. (Cl. 172—233)

This invention relates to electrolytic condensers used for starting of single phase motors, and for power factor correction etc.

One of the objects of this invention is to provide a protective housing for enclosing an electrolytic condenser and for mounting it upon the frame of an electric motor, so as to insure both its electrical insulation and thermal insulation.

A further object of the invention is to provide a protective housing for securely mounting condensers of varying sizes upon a motor frame.

A further object of the invention is to provide an enclosure and mounting for electrolytic condensers upon motor frames, so as to shield the condenser from heat developed by the motor during operation.

Further objects and advantages of the present invention will be apparent from the following description, reference being had to the accompanying drawing wherein a preferred embodiment of the present invention is clearly shown.

In the drawing:

Fig. 1 is a fragmentary end view of a motor frame, with a condenser mounting of the instant invention secured thereon, the condenser mounting being shown in transverse section, substantially as indicated by the line and arrows 1—1 of Fig. 2.

Fig. 2 is a vertical sectional view through the motor frame and condenser housing, substantially as indicated by the line and arrows 2—2 of Fig. 1.

Fig. 3 is a horizontal sectional view through the condenser mounting means, substantially as seen along the line and in the direction of the arrows 3—3 of Fig. 1.

Fig. 4 is a perspective view of the saddle or spring means for supporting the condenser assembly within the housing.

Fig. 5 is a perspective view of a modified form of spring saddle.

With particular reference to the drawing 10 refers to a motor frame of rounded or cylindrical formation and whose ends are fitted with the end members 12, usually providing an end bearing for the rotor of the motor, the end frame 12 being apertured at 14 for ingress and egress of air in cooling of the windings enclosed within the frame members 10 and 12. Where electric motors are equipped with electrolytic condensers, we mount them in heat insulated and electrically insulated relation with respect to the motor frame, by surrounding them with insulation, and then by placing them on a cradle or saddle, thence by disposing over the enclosed condensers, a protective housing.

In the illustrated embodiment, 20 refers to an electrolytic condenser that in the commercial form, incorporates an outside, thin, metallic shell or casing rolled inwardly at 22 to provide a seat or shoulder for an end closure member 24, against which is spun or rolled the terminating edge 26 of the casing to perfect the seal as between the interior and exterior of the condenser. The head member 24 provides a pair of terminals 28 and 30 to which are secured leads 32 and 34, leading to connections interior of the frame 10 and communicating with the windings of the motor, as is the usual practice. This condenser 20 is enclosed in a thick paper or other insulating tube 36, that is of sufficient length to extend beyond each end of the condenser 20, where it is closed by insulating or non-conducting disc members 38 and 40, which thus substantially completely surrounds the metallic exterior of the condenser 20 with electrically non-conducting material or insulators. The only exception to this complete enclosure, is that of a notch or aperture 42 at one end of the tube 36, that allows for passing of the leads 32 and 34 from the condenser terminals to the interior of the motor frame.

About this insulatingly enclosed condenser we dispose a half rounded steel shell 44 of the general configuration illustrated in Fig. 1, wherein a rounded part 46 is adapted to be engaged by the tube 36 of the enclosed condenser, and wherein the straight side walls 48, and end walls 50, drop down to the general contour of the motor frame 10. The edge portions of the side walls 48 are bent outwardly to provide attaching ears 52 that are apertured at 54 for reception of screws 56, by which the housing is secured to the frame 10. We provide a shim or packing member 58 of both electrical and thermal insulating material that overlies the frame 10, and that is disposed beneath the attaching ears 52 of the housing, one end of the shim 58 being apertured at 60 to provide for passage of the leads 32 and 34 from the condenser terminals to the interior of the motor.

Thus we provide for mechanical protection of the condenser by enclosing it within the housing 44, and we provide for electrical insulation as respects the metallic shell of the condenser by enclosing it in the non-conducting members 36, 38 and 40. It is further electrically insulated, and is also thermally insulated by the shim 58 that separates the condenser from the motor frame. Making for additional thermal insulation of the condenser from heat generated by the motor, we insert a cradle or saddle 62, between the non-conducting tube 36 and the shim 58, which cradle is so formed as to take up the space existing between the condenser and the motor frame when different sizes of condensers are mounted within the same housing and push the condenser to the top side of the housing.

Fig. 4 illustrates in detail the features of one form, that comprises a sheet metal member having a longitudinally arranged medial plane or web 64, along the opposite edges of which there are a plurality of tongue like members 66 and 68 in alternating arrangement, effected by shearing the metal part way in from opposite edges. The ears 68 are bent upward at an inclination to the web portion 64, while the ears 66 are bent downward at an opposite inclination with the same plane, and thence partially rolled or curled up at their terminating ends, as illustrated at 70. With the cradle thus formed, it serves to hold various sized condensers mounted within the housing 44, since placing it with the curled up edges 70 engaging the shim 58, and with the enclosed condenser resting on the deflected arms 68, the cradle is yieldingly compressible to always fill the range of spacing that may exist within the housing 44, between the shim 58 and the condenser enclosed.

Fig. 5 illustrates in detail the features of a modified form of cradle, that comprises a formed spring wire member. There the cradle 72 has a straight bridge piece 74, at each end of which there is integrally joined a spring bow 76. Each spring bow provides the arm 78 and 80 integrally joined by the loop or bight 82, the arm 78 connecting the bridge 74 with the bight 82 and designed to engage or rest upon the insulator 58, while the bight 82 acts as a spring for biasing the condenser arm 80 against the condenser.

In either instance, when a condenser of maximum dimension is disposed within the housing the cradle will be substantially collapsed, but when a condenser of smaller dimension is enclosed within the housing there will be less collapsing of the cradle member. The resiliency of the arms 66 and 68, or 78 and 80 as the case may be, are sufficient to push the condenser assembly away from the motor frame and against the inside of the rounded portion 46 of the housing. In assembling the parts, tightening of the attaching screws 56 will operate through the housing walls and condenser body to somewhat collapse the cradle, as compared with its loose assembled relation, yet the space between the shim 58 and the condenser insulator will be effectively filled by the cradle, and no shifting of the parts will be experienced after the assembly has been completed.

While the embodiment of the present invention as herein disclosed, constitutes a preferred form, it is to be understood that other forms might be adopted, all coming within the scope of the claims which follow.

What is claimed is as follows:

1. In a condenser equipped electric motor, a condenser mounting comprising in combination, a paper tube with loosely assembled discs substantially enclosing the condenser, a steel housing of U-shaped cross section disposed over the assembled disc and tube and having ears adapted to be secured to the motor frame, said housing maintaining the discs within the tube ends, a non-conducting shim disposed against the motor frame and supporting the housing ears, and a yieldably compressible member disposed between the shim and tube for urging the condenser against one wall of the housing, one end of said tube and shim being apertured to provide for passage of condenser leads to the interior of the motor frame.

2. In an electric motor having a frame, and wherein an electrolytic condenser inclosed in a metallic shell has its leads in circuit with the windings of the motor, the combination comprising, insulating means substantially enclosing the condenser, an open sided metallic housing disposed over the insulated condenser and adapted for mounting upon the motor frame, said frame completing the condenser inclosure, and means for insulating the condenser against the heat generated by the motor comprising, a shim of non-conducting material disposed between the housing and motor frame, and a resilient cradle resting upon the shim and supporting the condenser against the closed side of the housing for spacing the condenser from the motor frame.

EDWARD B. SLEETER.
HARRY HURST.